US012547100B2

(12) United States Patent
Kitamura

(10) Patent No.: US 12,547,100 B2
(45) Date of Patent: Feb. 10, 2026

(54) POWDER CONTAINER AND IMAGE FORMING DEVICE

(71) Applicant: SHARP KABUSHIKI KAISHA, Sakai (JP)

(72) Inventor: Keizoh Kitamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/897,144

(22) Filed: Sep. 26, 2024

(65) Prior Publication Data

US 2025/0155836 A1 May 15, 2025

(30) Foreign Application Priority Data

Nov. 15, 2023 (JP) ................................ 2023-194364

(51) Int. Cl.
*G03G 15/08* (2006.01)

(52) U.S. Cl.
CPC . *G03G 15/0889* (2013.01); *G03G 2215/0816* (2013.01)

(58) Field of Classification Search
CPC .................. G03G 15/0889; G03G 2215/0816
See application file for complete search history.

(56) References Cited

U.S. PATENT DOCUMENTS

2019/0056681 A1* 2/2019 Sakai ................ G03G 15/0877
2019/0302651 A1* 10/2019 Kusano ............. G03G 15/0889
2023/0305436 A1* 9/2023 Sudo .................... G03G 15/087

FOREIGN PATENT DOCUMENTS

JP 2005-106966 A 4/2005

* cited by examiner

*Primary Examiner* — Hoang X Ngo
(74) *Attorney, Agent, or Firm* — ScienBiziP, P.C.

(57) ABSTRACT

There is provided a powder container including a holder that stores powder, a stirring unit that stirs the powder, and a swing member to drop the powder remaining on an inner wall of the holder. The stirring unit includes a rotation shaft rotatably supported in the holder, and a stirring member provided to the rotation shaft in such a manner as to protrude outward in a radial direction. The inner wall includes a wall along an intersecting direction intersecting with a rotation axis direction of the rotation shaft. A base side of the swing member includes a fixed portion that is fixed to the all along the intersecting direction of the holder, and a movable side of the swing member swings about the fixed portion by being pressed by the stirring member due to the rotation of the rotation shaft.

10 Claims, 17 Drawing Sheets

POWDER CONTAINER AND IMAGE FORMING DEVICE

TECHNICAL FIELD

The present disclosure relates to a powder container that stores and stirs powder (for example, toner), and an image forming device including a powder container, such as a copy machine, a multifunctional device, a printer, or a facsimile device.

BACKGROUND ART

An image forming device such as a copy machine, a multifunctional device, a printer, or a facsimile device includes an image forming device using an electrophotographic scheme. Some image forming devices are provided with: a powder container including a holder that stores powder (for example, toner) used for developing an electrostatic latent image formed on an image carrier (for example, a photoreceptor drum) and has a discharge port through which the powder is discharged; and a stirring member that stirs the powder and conveys the stirred powder to the discharge port. For example, a toner cartridge detachably attached to the image forming device is widely used as the powder container.

In recent years, with the downsizing of an image forming device, there has been provided a powder container whose shape is designed to be fitted in a limited space between the members and to have a large capacity as much as possible. For example, a powder container including a holder whose size in a longitudinal (height) direction is larger than the size in a lateral (width) direction is used in some cases. In such a powder container, even when a stirring member provided in the lower portion rotates, the stirring member does not reach the inner wall in the upper portion of the holder. In a case where the inner wall of the holder is set to be vertical, the powder is likely to drop and unlikely to adhere to the inner wall. However, in a case where the inner wall of the holder has an inclined surface that is inclined to extend outward as being separated upward from a predetermined position above the discharge port, the powder may remain on the inclined surface that the stirring member does not reach. On the other hand, the powder adhering to the inner wall in the upper portion of the holder can be dropped by providing a stirring member in the upper portion of the holder and rotating the stirring member in the same manner as in the lower portion of the holder, but, in consequence, the cost increases.

For this reason, a powder container of the related art is provided with a swing member used for dropping the powder remaining on the inner wall of the holder in some cases. There has been known a developer container including a plate-shaped swing member disposed along the inner wall of a holder that stores developer. One end of the swing member is fixed to the inner wall, and the other end thereof swings about a rotation axis parallel to a rotation shaft of a stirring member (swing scheme) as the stirring member moves the other end in a direction away from the inner wall, thereby scraping off the developer remaining on the inner wall.

SUMMARY

Technical Problem

However, in the configuration of the powder container of the related art described above, in order for the swing member to swing about the rotation axis parallel to the rotation shaft of the stirring member (swing scheme), the stirring member needs to engage with and push a leading end portion of the swing member upward from below. For example, part of the leading end portion of the swing member in the rotation axis direction is a bent portion that is bent to be separated upward from the inner wall of the holder. As a result, since the bent portion of the swing member is separated from the inner wall of the holder, the powder enters a portion on the inner wall of the holder corresponding to the bent portion, from both sides in the rotation axis direction of the bent portion of the swing member. Further, when the stirring member rotates in a direction opposite to the direction in which the swing member is pushed upward, the swing member is pressed toward a lower side of the stirring member, and therefore the swing member does not sufficiently function as a swing member. In any case, it is not possible to reliably suppress a situation in which the powder remains on the inner wall of the holder.

The present disclosure has been made in order to solve the above-mentioned problems, and an object thereof is to provide a powder container and an image forming device capable of reliably suppress a situation in which powder remains on the inner wall of a holder.

Solution to Problem

In order to solve the above issues, a powder container according to the present disclosure includes a holder that stores powder and has a discharge port through which the powder is discharged, a stirring unit that stirs the powder, and a swing member to drop the powder remaining on an inner wall of the holder. The stirring unit includes a rotation shaft rotatably supported in the holder, and a stirring member provided to the rotation shaft in such a manner as to protrude outward in a radial direction. The inner wall includes a first wall along an intersecting direction intersecting with a rotation axis direction of the rotation shaft. A base side of the swing member includes a fixed portion that is fixed to the first wall along the intersecting direction of the holder, and a movable side of the swing member swings about the fixed portion by being pressed by the stirring member due to the rotation of the rotation shaft of the stirring unit.

In another aspect of the present disclosure, an image forming device includes the above-described powder container.

Advantageous Effects of Disclosure

According to the present disclosure, the movable side of the swing member is pressed by the stirring member due to the rotation of the rotation shaft of the stirring unit, so that the swing member swings about the fixed portion along the intersecting direction intersecting with the rotation axis direction of the rotation shaft. As a result, the powder remaining on the inner wall along the intersecting direction intersecting with the rotation axis direction of the rotation shaft in the holder can be dropped.

The above-described object, other objects, features, and advantages of the present disclosure will be made further obvious from the detailed description of embodiments given below with reference to the drawings.

DESCRIPTION OF EMBODIMENTS

Hereinafter, embodiments of a powder container and an image forming device according to the present disclosure will be described with reference to the drawings. In the following description, the same components are denoted by the same reference signs. The same applies to the names and functions of the components. Accordingly, detailed descriptions thereof are not repeated.

Image Forming Device

First, an image forming device according to the present disclosure will be described with reference to FIG. 1.

Figure 1:
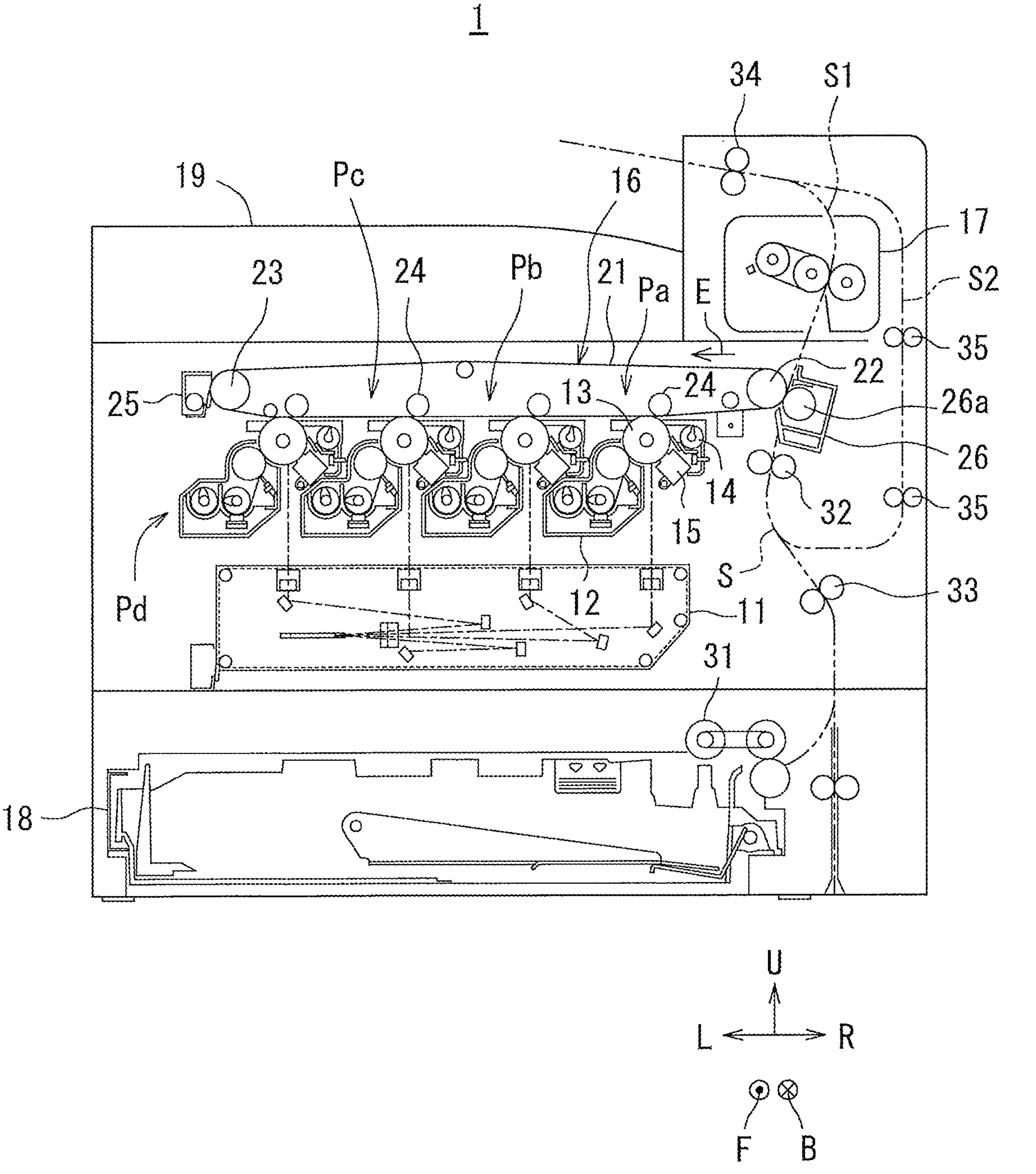
FIG. 1 is a schematic side view of an image forming device to which a powder container according to embodiments of the present disclosure is applied.

FIG. 1 is a schematic side view of an image forming device 1 according to the present disclosure. As illustrated in FIG. 1, the image forming device 1 includes an exposure device 11, a development device 12, a photoreceptor drum 13, a cleaner device 14, a charger 15, an intermediate transfer belt device 16, a fixing device 17, a feed tray 18, an output tray 19, and a sheet conveying path S, and forms a multicolor image and a monochrome image on a predetermined sheet in accordance with image data transmitted from the outside.

The image data used in the image forming device 1 corresponds to a color image made up of the colors black (K), cyan (C), magenta (M), and yellow (Y). Accordingly, four sets of the development device 12, photoreceptor drum 13, charger 15, and cleaner device 14 are provided, and respectively set to black, cyan, magenta, and yellow to form four types of latent images corresponding to the respective colors. Thus, four image stations Pa, Pb, Pc, and Pd are constituted.

The photoreceptor drums 13 are each disposed substantially at the center of the image forming device 1. The charger 15 causes the surface of the photoreceptor drum 13 to be uniformly electrically charged at a predetermined electric potential. The exposure device 11 exposes the surfaces the photoreceptor drums 13 to form electrostatic latent images. The development device 12 develops an electrostatic latent image on the surface of the photoreceptor drum 13 to form a toner image on the surface of the photoreceptor drum 13. With this series of operations, the toner images of respective colors are formed on the respective surfaces of the photoreceptor drums 13. The cleaner devices 14 each remove and collect residual toner on the surface of the photoreceptor drum 13 after development and image transfer. In the present disclosure, the vicinity of the photoreceptor drum 13 corresponds to an image former.

The intermediate transfer belt device 16 is disposed above the photoreceptor drums 13, and includes an intermediate transfer belt 21, an intermediate transfer belt driving roller 22, an intermediate transfer belt driven roller 23, an intermediate transfer roller 24, and an intermediate transfer belt cleaning device 25. Four intermediate transfer rollers 24 are provided corresponding to the image stations of the respective colors for YMCK.

The intermediate transfer belt 21 is stretched over the intermediate transfer belt driving roller 22, the intermediate transfer belt driven roller 23, and the intermediate transfer rollers 24 in such a manner that the surface of the intermediate transfer belt 21 is moved in a predetermined direction (an arrow E direction in the drawing).

The intermediate transfer belt 21 circularly moves in the arrow E direction, the residual toner is removed and collected by the intermediate transfer belt cleaning device 25, and the toner images of the respective colors formed on the surfaces of the photoreceptor drums 13 are sequentially transferred and superimposed to form a color toner image on the surface of the intermediate transfer belt 21.

The image forming device 1 further includes a secondary transfer device 26 including a transfer roller 26*a*. A nip region is formed between the transfer roller 26*a* and the intermediate transfer belt 21, and the transfer roller 26*a* conveys a sheet having been conveyed through the sheet conveying path S while nipping the sheet in the nip region. When the sheet passes through the nip region, the toner image on the surface of the intermediate transfer belt 21 is transferred to the sheet.

The feed tray 18 stores sheets to be used for image formation, and is provided below the exposure device 11. The output tray 19 is provided at an upper side of the image forming device 1, and serves as a tray for setting the sheets on which images have been formed.

The sheet conveying path S includes a main path S1 formed in an S shape, and a reverse path S2, which branches from and rejoins with the main path S1. A pickup roller 31, a pre-registration roller 33, a registration roller 32, the secondary transfer device 26, the fixing device 17, and a sheet discharge roller 34 are disposed along the main path S1. The reverse path S2 branches from between the fixing device 17 and the sheet discharge roller 34, passes through a plurality of conveying rollers 35, and rejoins at a location between the pre-registration roller 33 and the registration roller 32.

The pickup roller 31 is provided in the vicinity of an end portion of the feed tray 18, and is a so-called pull-in roller that supplies sheets one by one from the feed tray 18 to the sheet conveying path S. The registration roller 32 temporarily holds a sheet conveyed from the feed tray 18, and conveys the sheet to the transfer roller 26*a* at a timing at which a leading end of the toner image on the intermediate transfer belt 21 and a leading end of the sheet are aligned. The pre-registration roller 33 is a small-sized roller to facilitate the conveyance of the sheet.

The fixing device 17 is of a belt fixing type in which a fixing belt is wound around a fixing roller and a heating roller. In the fixing device 17, a pressure roller is pressed against the fixing roller via the fixing belt. The fixing device 17 receives a sheet on which an unfixed toner image is formed, and conveys the sheet while nipping the sheet between the fixing belt and the pressure roller. The sheet after fixing is discharged onto the output tray 19 by the sheet discharge roller 34.

In a case where an image is formed not only on the surface but also on the rear surface of a sheet, the sheet is conveyed in a reverse direction from the sheet discharge roller 34 to the reverse path S2, and the front and rear of the sheet is reversed. Subsequently, the sheet is guided again to the registration roller 32, an image is formed on the rear surface in the same manner as on the surface, and the sheet is conveyed onto the output tray 19.

The image forming device 1 according to the present disclosure includes a powder container that stores powder. Examples of the powder include toner, a two-component developer containing toner and a carrier as main components, and a one-component developer containing toner as a main component. In general, when the powder is toner, the powder container is a toner cartridge; when the powder is developer, the powder container is a developer tank that stores developer in the development device. The toner cartridge may contain, in addition to toner, a carrier for compensating for the carrier reduced by development in the developer tank. The powder container is not limited to the above configurations, and a cubic box-shaped container can be representatively exemplified, but a cylindrical container or a container having another shape may be used.

In this example, the powder is toner, and the powder container is a toner cartridge 10.

The image forming device 1 is provided with the toner cartridge 10 (not depicted in FIG. 1, see FIGS. 2A to 2D described later) filled with toner, and the toner cartridge 10 supplies toner to the development device 12 as necessary. The toner cartridge 10 is attachable to and detachable from the image forming device 1, and can be replaced with a new toner cartridge 10 by a user when the toner stored in the cartridge is used up.

Next, details of the toner cartridge 10 will be described with reference to FIGS. 2A to 12B.

First Embodiment

Figure 2A:
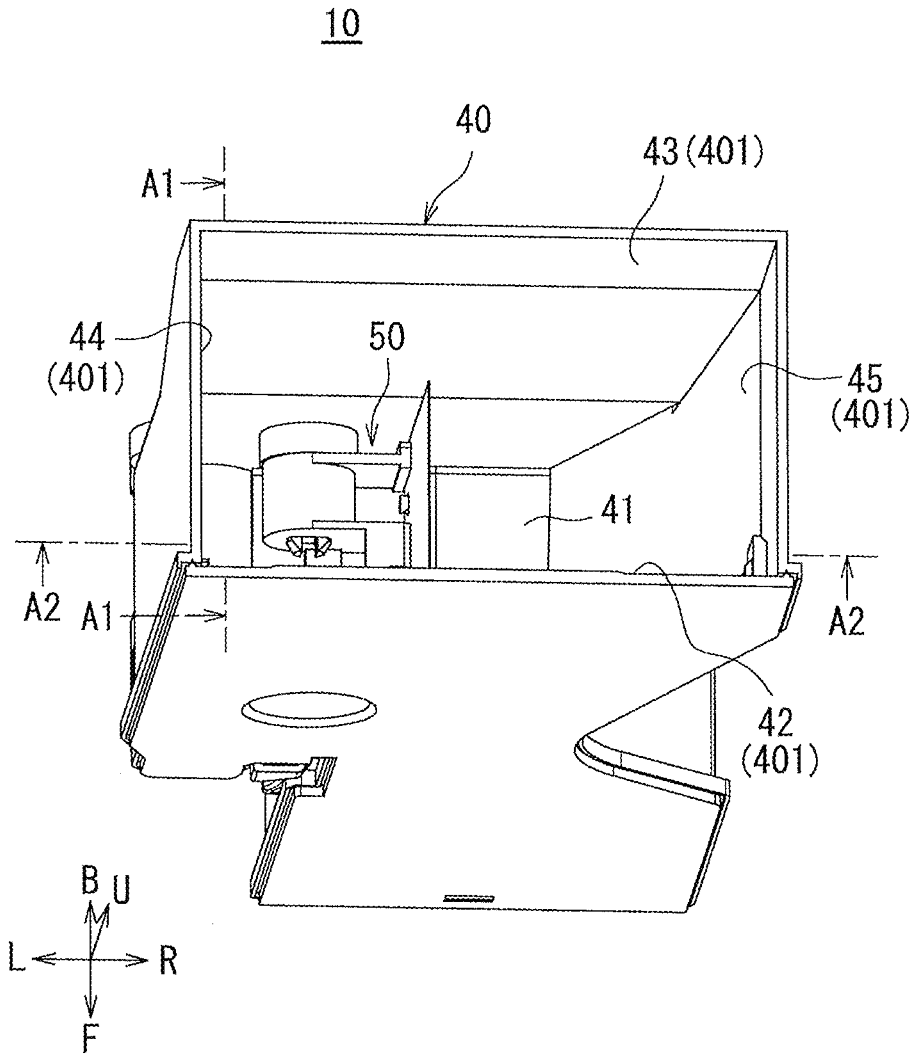
FIG. 2A is a perspective view schematically illustrating a structure of a powder container according to embodiments of the present disclosure.
Figure 2B:
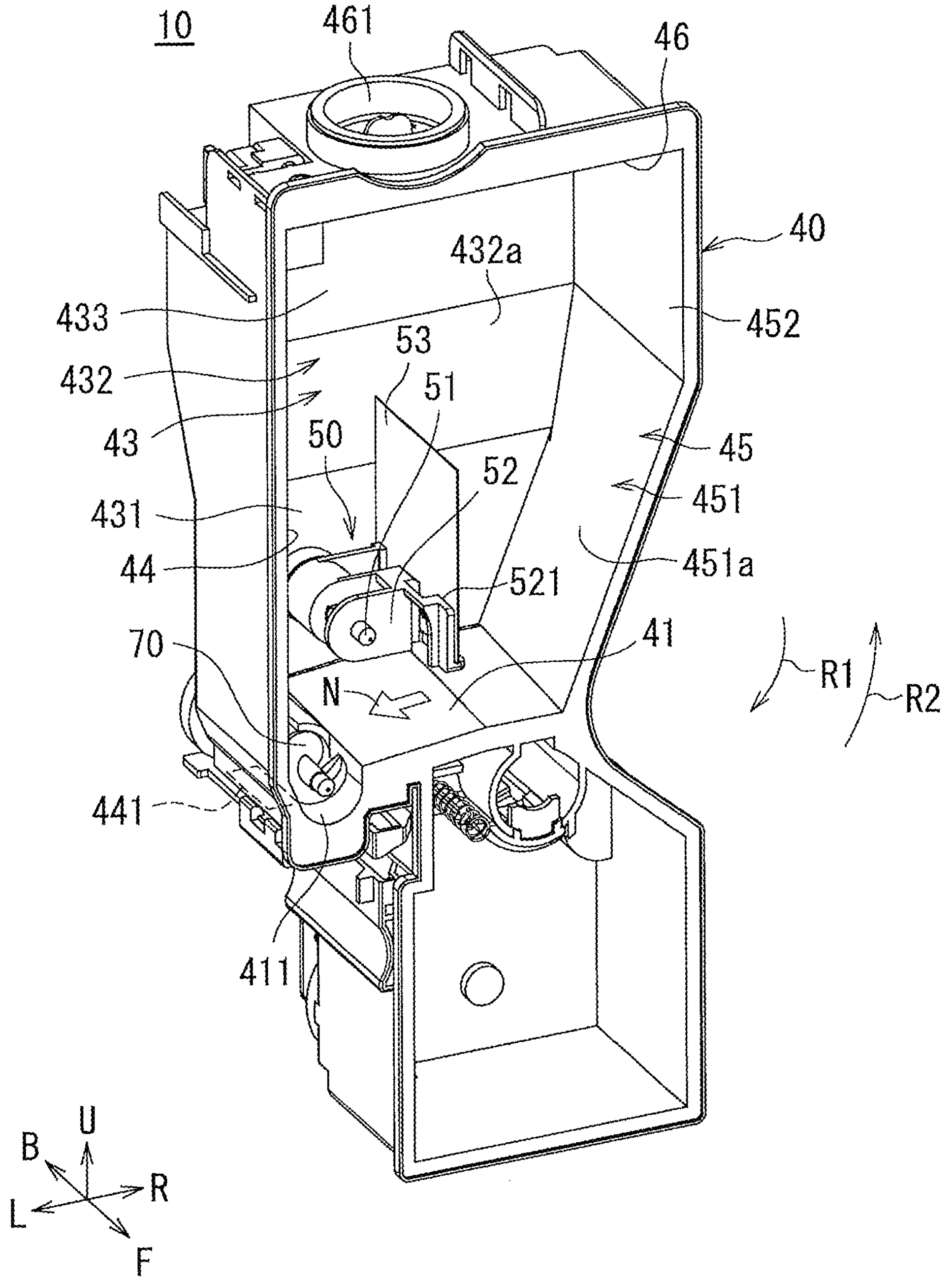
FIG. 2B is a perspective view schematically illustrating a structure of a powder container according to embodiments of the present disclosure.
Figure 2C:
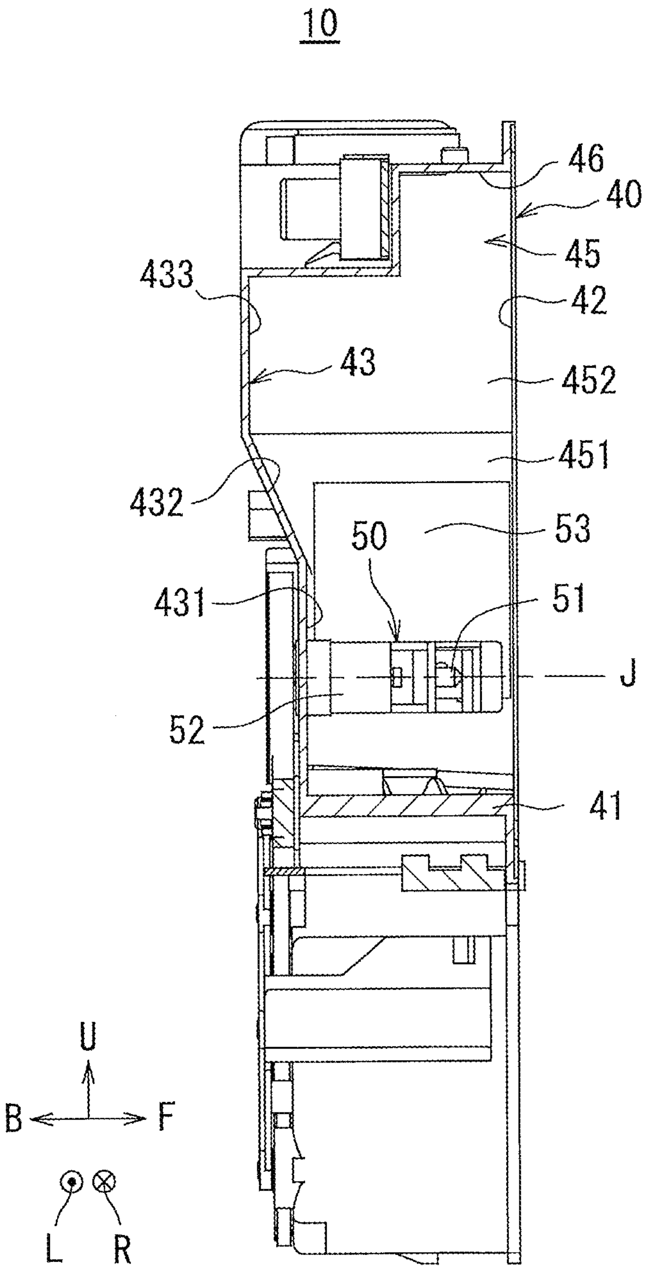
FIG. 2C is a cross-sectional view schematically illustrating a structure of a powder container according to embodiments of the present disclosure.
Figure 2D:
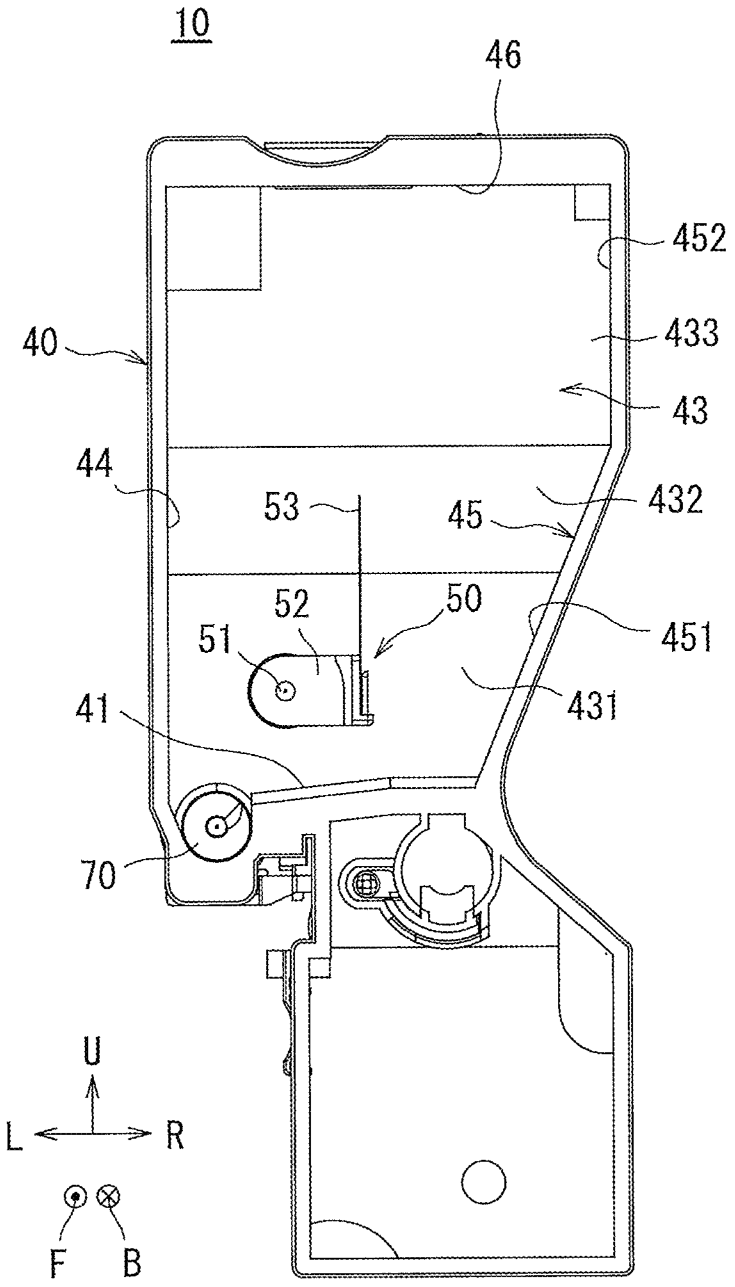
FIG. 2D is a cross-sectional view schematically illustrating a structure of a powder container according to embodiments of the present disclosure.

FIGS. 2A to 2D are diagrams schematically illustrating a configuration of the toner cartridge 10 of the present embodiment. FIG. 2A is a perspective view of the toner cartridge 10 viewed from above, FIG. 2B is a perspective view of the toner cartridge 10 viewed from the left side of the front, FIG. 2C is a cross-sectional view in an arrow direction along a line A1-A1 in FIG. 2A, and FIG. 2D is a cross-sectional view in an arrow direction along a line A2-A2 in FIG. 2A. In the drawings, when viewed from the front of the image forming device 1, an arrow U indicates an upper side, an arrow F indicates a front side, an arrow B indicates a rear side, an arrow R indicates a right side, and an arrow L indicates a left side. Here, the front of the image forming device 1 refers to a side where a user operates the image forming device 1.

In FIGS. 2A to 2D and FIG. 3 described later, a swing member 80 described later is not illustrated.

As illustrated in FIGS. 2A to 2D, the toner cartridge 10 includes a holder 40 (in this example, a toner chamber) having a discharge port 441, and a stirring unit 50 and a screw 70 disposed inside the holder 40.

The stirring unit 50 stirs the toner and includes a rotation shaft 51, a support member 52, and a stirring member 53.

An inner wall 401 (see FIG. 2A) of the holder 40 includes a rear wall 43 (an example of a first wall) along an intersecting direction (in this example, the left-right direction (L, R) orthogonal to the rotation axis direction) intersecting with the rotation axis direction (in this example, the front-rear direction (F, B)) of the rotation shaft 51. Specifically, the holder 40 includes a bottom portion 41, a plurality of walls (in this example, a front wall 42, the rear wall 43, a left wall 44, and a right wall 45 (an example of a second wall)), and a ceiling portion 46 connecting upper ends of the front wall 42, the rear wall 43, the left wall 44, and the right wall 45. Consequently, the holder 40 is formed in a rectangular tube with a hollow interior. The front wall 42 is orthogonal to the bottom portion 41 at a front end of the bottom portion 41. The rear wall 43 extends upward from a rear end of the bottom portion 41. The left wall 44 extends upward from a left end of the bottom portion 41. The right wall 45 extends upward from a right end of the bottom portion 41. The front wall 42, the rear wall 43, the left wall 44, and the right wall 45 constitute the inner wall 401.

The bottom portion 41 is formed in a rectangular shape in which a width size in the left-right direction (L, R) is larger than a width size in the front-rear direction (F, B) in a plan view (when viewed from above). In the bottom portion 41, a region occupying a half or more, in this example, two-thirds or more of one side (in this example, the left side) in the left-right direction (L, R) of the bottom portion 41 is inclined downward toward the one side end portion, and a recessed portion 411 extending along the front-rear direction (F, B) and recessed downward is formed at the one side end portion. In the recessed portion 411, the screw 70 is disposed, and the discharge port 441 for discharging the toner to the development device 12 is provided.

The holder 40 is surrounded by the bottom portion 41, the front wall 42, the rear wall 43, the left wall 44, the right wall 45, and the ceiling portion 46.

Specifically, the bottom portion 41, the left wall 44, the right wall 45, and the ceiling portion 46 are orthogonal to both the front wall 42 and the rear wall 43.

At least one of the plurality of walls (the front wall 42, the rear wall 43, the left wall 44, and the right wall 45) of the inner wall 401 is provided with one or a plurality of inclined surfaces that are inclined to extend outward as the distance in the upward direction from the bottom portion 41 increases.

Specifically, the rear wall 43 includes a first rear wall 431 rising substantially perpendicularly to the bottom portion 41, a second rear wall 432 inclined to extend outward (rearward) as the distance in the upward direction from the first rear wall 431 increases, and a third rear wall 433 extending upward from the second rear wall 432 in parallel with the first rear wall 431. The second rear wall 432 has a first inclined surface 432*a*.

The left wall 44 is continuous with the left end of the recessed portion 411 on the bottom portion 41 and extends upward substantially perpendicularly to the bottom portion 41.

The right wall 45 includes a first right wall 451 inclined to extend outward (rightward) as the distance in the upward direction from the bottom portion 41 increases, and a second right wall 452 extending upward from the first right wall 451 perpendicularly to the bottom portion 41 and the third rear wall 433. The first right wall 451 has a second inclined surface 451*a*.

The ceiling portion 46 is formed in a substantially rectangular shape and is configured to horizontally cover the upper side of the holder 40. In addition, an injection port 461 for injecting toner is provided at the leftward side of the ceiling portion 46.

The rotation shaft 51 is rotatably provided along the front-rear direction (F, B) at a lower portion of the rear wall 43 (at a lower half side thereof in the up-down direction). Specifically, the rotation shaft 51 is provided near the upstream side of the discharge port 441 (at a predetermined distance from the discharge port 441) in a toner conveyance direction N (see FIG. 2B), in which the toner is conveyed toward the discharge port 441 along the bottom portion 41. In this example, the rotation shaft 51 is rotatably attached to a position on the leftward side of the first rear wall 431 of the rear wall 43 in a state of extending in the front-rear direction (F, B), and is installed in such a manner that it is driven by a driver (not illustrated) via a drive mechanism (not illustrated) to be rotatable in a first rotation direction R1, which is a rotation direction for the toner conveyance direction N.

One end portion of the support member 52 is fixed (fitted) to the rotation shaft 51, and the other end portion thereof holds the stirring member 53.

The stirring member 53 refers to one or multiple sheet-like stirring blades (in this example, one blade) made of an elastic member, and is installed to protrude outward in the radial direction with respect to the rotation shaft 51. That is, a lower end portion of the stirring member 53 is fixed to the support member 52 in a state of being parallel to the extending direction of a rotation axis J of the rotation shaft 51 (the rotation axis direction (B, F)) and being orthogonal to the first rear wall 431 (see FIG. 2C). In this example, the support member 52 extends in the radial direction centered at the rotation axis J, has an attachment surface 521 (see FIG. 2B) along the rotation axis direction (B, F), and the stirring member 53 is attached to the attachment surface 521. When a plurality of the stirring blades are used as the stirring member 53, the plurality of stirring blades may be evenly arranged in a circumferential direction of the rotation shaft 51.

When the rotation shaft 51 rotates, the stirring member 53 rotates along with the support member 52, which rotates together with the rotation shaft 51. This makes it possible for the stirring member 53 to stir the toner in the holder 40.

The screw 70 is rotatably provided on the first rear wall 431 of the rear wall 43 in a state of being accommodated in the recessed portion 411 along the front-rear direction (F, B). The screw 70 is driven by a driver (not illustrated) via a drive mechanism (not illustrated). Then, the screw 70 rotates in the first rotation direction R1 and conveys the toner to the discharge port 441. Thus, the toner discharged from the discharge port 441 can be supplied to the development device 12.

Figure 3:
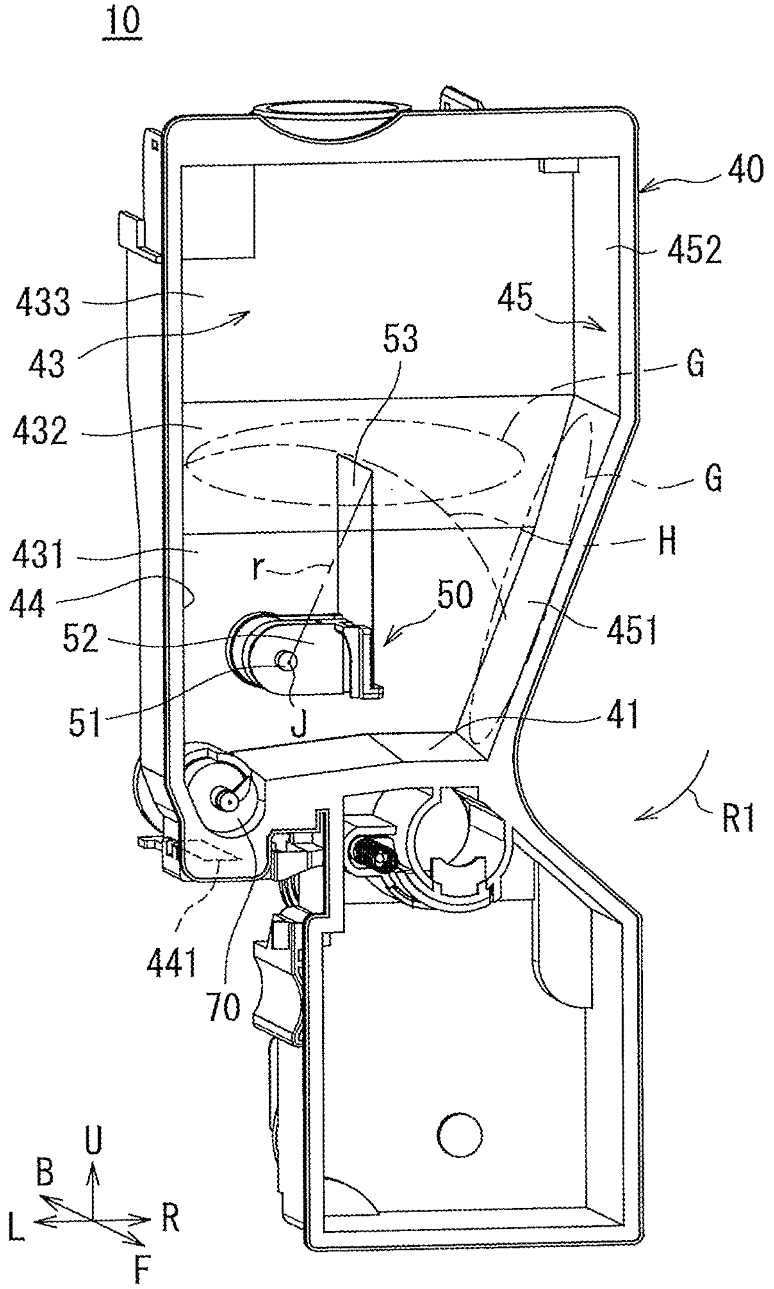
FIG. 3 is a perspective view for explaining operations of a stirring unit in a powder container.

FIG. 3 is a perspective view for explaining a rotation operation of the stirring unit 50 in the holder 40. When the rotation shaft 51 is driven by a driver (not illustrated) and rotates in the first rotation direction R1, the stirring member 53 fixed to the support member 52, which rotates together with the rotation shaft 51, also rotates in the first rotation direction R1 to stir the toner within the holder 40 and convey the toner in a direction toward the screw 70. In a case where the swing member 80 is not provided, a rotation locus of the leading end of the stirring member 53 is an arc (an arc indicated by a one-dot chain line in FIG. 3) centered at the rotation axis J of the rotation shaft 51, and a distance r from the leading end of the stirring member 53 to the axis center of the rotation shaft 51 is the radius of the arc. Here, a range inside the arc is referred to as a stirring center region H. The stirring center region H is located closer to the discharge port 441 side (leftward side in this example) in the left-right direction (L, R) of the lower half portion in the holder 40. Thus, the toner in the lower half portion is favorably stirred and moved to the screw 70, and is conveyed to the discharge port 441 by the screw 70. As a result, the toner is supplied from the discharge port 441 to the development device 12.

Note that in the toner cartridge 10, in the case where the swing member 80 is not provided, the toner cannot be reliably stirred by the stirring member 53 and may remain on the inner wall (for example, the front wall 42, the rear wall 43, the left wall 44, or the right wall 45) of the holder 40.

For example, in the present embodiment, a height size in the up-down direction of the holder 40 is approximately 1.5 to 2 times or more a width size in the left-right direction (L, R) thereof; further, the second rear wall 432 above the first rear wall 431 attached with the rotation shaft 51 is inclined rearward, and the first right wall 451 facing the rotation shaft 51 is inclined rightward. Due to this, the toner located in a region inclined at a position away from the stirring center region H (for example, regions G and G each surrounded by a one-dot chain line ellipse in FIG. 3) is difficult to be stirred, and is particularly likely to remain on the second rear wall 432 and the first right wall 451 having the first inclined surface 432*a* and the second inclined surface 451*a*, respectively.

Figure 4:
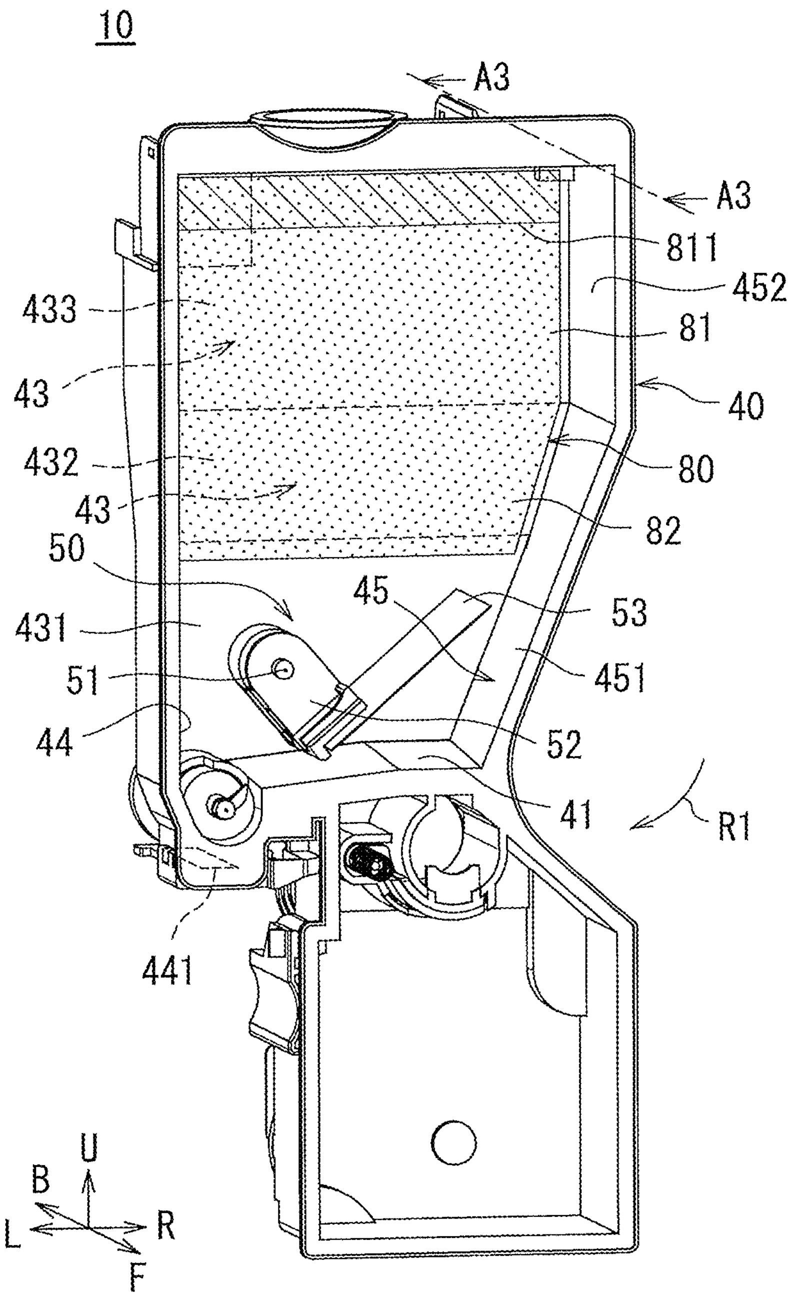
FIG. 4 is a perspective view illustrating a powder container provided with a swing member in a first embodiment.

In this regard, in the toner cartridge 10 according to the present embodiment, as illustrated in FIG. 4, the swing member 80 is attached to the rear wall 43 of the holder 40. The swing member 80 is a member to drop the toner remaining on the inner wall (in this example, the front wall 42, the rear wall 43, the left wall 44, or the right wall 45) of the holder 40.

The base side of the swing member 80 includes a fixed portion 811, which is fixed to the first wall (in this example, the rear wall 43) along the intersecting direction (L, R) of the holder 40. The movable side of the swing member 80 is pressed (pushed upward in this example) by the stirring member 53 due to the rotation of the rotation shaft 51 in the stirring unit 50, so that the swing member 80 swings about the fixed portion 811.

Examples of the mode in which the swing member 80 swings by being pressed by the stirring member 53 include a mode in which the swing member 80 swings by repeating a press operation where the swing member 80 is pressed by the stirring member 53 and a press release operation where the press operation is released, and a mode in which the swing member 80 swings depending on the strength of the press applied by the stirring member 53. In this example, the swing member 80 swings by repeating an engagement operation (press operation) in which the swing member 80 is engaged with (pressed against) the stirring member 53 and an engagement release operation (press release operation) in which the engagement operation is released.

In the present embodiment, the movable side of the swing member 80 is pressed by the stirring member 53 by the rotation of the rotation shaft 51 in the stirring unit 50. As a result, the swing member 80 swings about the fixed portion 811, and thus the toner can be moved downward, that is, toward the bottom portion 41 on the inner wall (42 to 45) of the holder 40. Therefore, it is possible to reliably suppress a situation in which the toner remains on the inner wall (42 to 45) of the holder 40. This scheme is particularly effective in a case where the inner wall (in this example, the rear wall 43 and the right wall 45) of the holder 40 has inclined surfaces (in this example, the first inclined surface 432$a$ and the second inclined surface 451$a$, where the toner is likely to remain).

The swing member 80 is formed of a sheet-like elastic member, and is disposed to protrude (extend) from the upper end portion of the rear wall 43 of the holder 40 along the third rear wall 433 and the second rear wall 432 by a predetermined protruding distance (to the vicinity of the rotation shaft 51 of the stirring unit 50) when not pressed by the stirring member 53. In this case, the protruding distance of the swing member 80 is a distance that allows the swing member 80 to be swung (engaged) when the rotation shaft 51 of the stirring unit 50 rotates. In this example, the rear wall 43, to which the swing member 80 is fixed, has a corner (a corner between the second rear wall 432 having the first inclined surface 432$a$ and the first rear wall 431), and the stirring member 53 swings (engages with) the swing member 80 at a position of the swing member 80 protruding from the corner (the corner between the second rear wall 432 and the first rear wall 431). However, when the swing member 80 is provided along a wall with no inclined surface (a wall having a flat surface as a whole), the swing member 80 does not have a position at which the stirring member 53 swings (engages with) the swing member 80. Accordingly, a mode can be exemplified in which a swing portion (for example, an engagement portion whose leading end portion is bent to be engaged with the stirring member 53) for allowing the stirring member 53 to swing (engage with) the swing member 80 is provided in the swing member 80.

Specifically, the swing member 80 includes an upper swing portion 81 formed in a rectangular shape and brought into contact with the entire area of the third rear wall 433 when not pressed by the stirring member 53, and a lower swing portion 82 formed in a trapezoidal shape and brought into contact with the entire area of the second rear wall 432 when not pressed by the stirring member 53, and extended toward the rotation shaft 51 beyond the lower end of the second rear wall 432. The upper swing portion 81 is connected to the fixed portion 811, which fixes the swing member 80 to the rear wall 43.

The lower swing portion 82 is formed integrally with the upper swing portion 81, and is bent forward at a predetermined angle θ1 (see FIG. 5A described later) with respect to the upper swing portion 81 in accordance with the inclined angle of the second rear wall 432 with respect to the third rear wall 433.

Figure 5A:
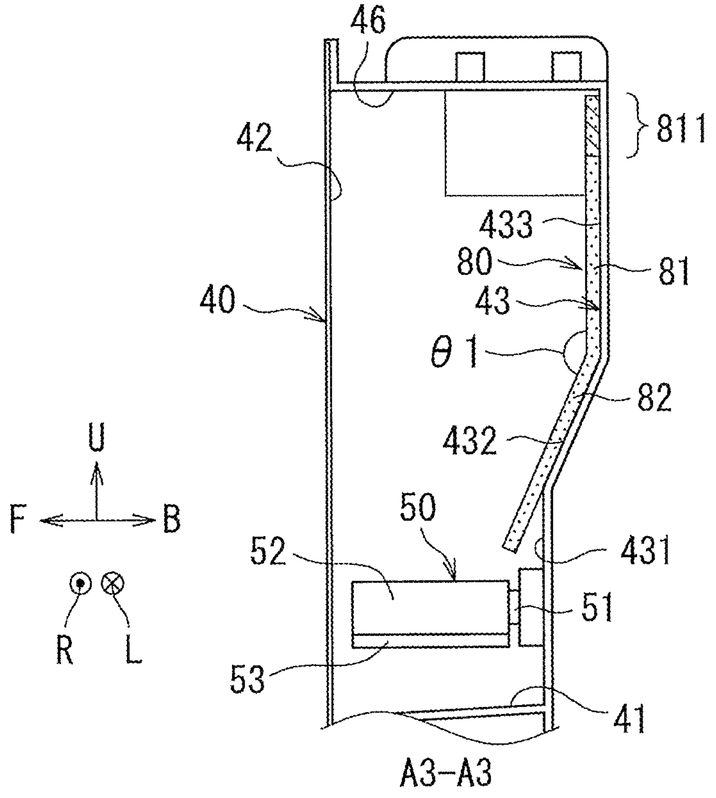
FIG. 5A is a cross-sectional view illustrating operations of the swing member in the first embodiment.
Figure 5B:
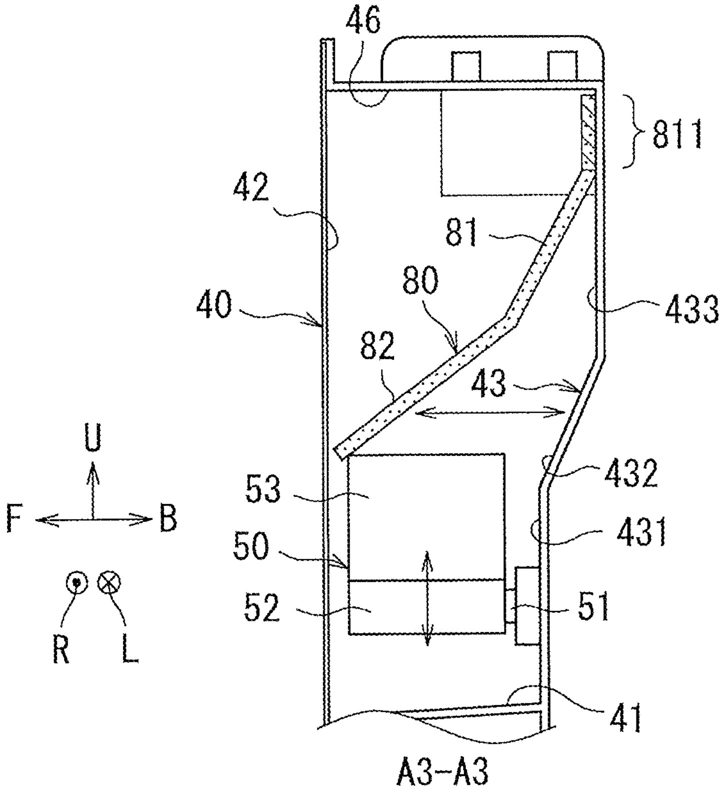
FIG. 5B is a cross-sectional view illustrating operations of the swing member in the first embodiment.

FIGS. 5A and 5B are each a cross-sectional view of the holder 40 in an arrow direction along a line A3-A3 in FIG. 4. As illustrated in FIG. 5A, in the holder 40, the base side of the swing member 80 is fixed (for example, bonded) to the upper end portion of the third rear wall 433 with the fixed portion 811. When the swing member 80 is not pressed by the stirring member 53, the upper swing portion 81 and the lower swing portion 82 are in contact with (cover) the entire areas of the third rear wall 433 and the second rear wall 432, and the leading end portion of the movable side faces the rotation shaft 51.

When the leading end portion of the movable side of the swing member 80 is pressed by the stirring member 53 due to the rotation of the rotation shaft 51, the swing member 80 swings about the fixed portion 811. Next, the operations thereof will be described in detail.

Here, the stirring member 53 is formed of a sheet-like elastic member having hardness higher than that of the elastic member of the swing member 80. When the stirring member 53 rotates in the first rotation direction R1 together with the rotation shaft 51, as illustrated in FIG. 5B, the stirring member 53 presses (pushes upward) the lower swing portion 82 of the swing member 80 and moves it in a direction away from the second rear wall 432. As a result, the upper swing portion 81 fixed with the fixed portion 811 moves in a direction away from the third rear wall 433 caused by the movement of the lower swing portion 82. Thereafter, when the leading end portion of the stirring member 53 further moves toward the downstream side in the first rotation direction R1 and separates from the leading end portion of the lower swing portion 82, the swing member 80 swings in a direction approaching the second rear wall 432 and the third rear wall 433 due to the elastic recovery force and its own weight and returns to the state illustrated in FIG. 5A.

That is, as the stirring member 53 rotates on a plane perpendicular to the rotation axis direction (B, F) of the rotation shaft 51, the swing member 80 swings about the fixed portion 811 along the intersecting direction (L, R) with respect to the rotation axis direction (B, F) of the rotation shaft 51, thereby repeating an operation of separating from the rear wall 43 or coming into contact with the rear wall 43 as indicated by an arrow in FIG. 5B. With this, the toner in the vicinity of the second rear wall 432 and the third rear wall 433 can be reliably dropped, and the toner in the vicinity of the first right wall 451 and the second right wall 452 can be scraped off. Therefore, it is possible to effectively prevent the toner from remaining on the inner wall (42 to 45), particularly on the first inclined surface 432$a$ and the second inclined surface 451$a$.

Accordingly, in the present embodiment, even in a case where a swing member cannot be attached to the right wall 45 parallel to the rotation shaft 51 and having the inclined surface (451$a$) due to a positional restriction with respect to the rotation direction (R1) of the stirring member 53, by providing the swing member 80 on the rear wall 43 perpendicular to the rotation shaft 51 and having the inclined surface (432$a$), the toner adhering to both the inclined surfaces (451$a$, 432$a$) of the right wall 45 and the rear wall 43 can be effectively dropped.

Further, in the present embodiment, the extending direction of a turning (swing) axis of the swing member 80 (extending direction of the fixed portion 811 along the upper end of the third rear wall 433) intersects (in this example, is orthogonal to) the extending direction of the rotation axis of the stirring member 53 (the rotation axis J of the rotation shaft 51). Because of this, even when the stirring member 53 rotates not only in the first rotation direction R1 but also in a second rotation direction R2 (see FIG. 2B), the swing member 80 can be easily pressed (pushed upward).

Further, in the present embodiment, the first wall (the rear wall 43 in this example) is perpendicular to the rotation axis direction (B, F). The fixed portion 811 of the swing member 80 is fixed to the upper side of the first wall (in this example, the rear wall 43) of the holder 40.

With this configuration, the swing member 80 is fixed to the upper side of the first wall (43) perpendicular to the rotation axis direction (B, F) of the rotation shaft 51 via the fixed portion 811. Due to this, the swing member 80 can drop the toner from the upper side of the first wall (43) by swinging with respect to the first wall (43) about the fixed portion 811 along the direction perpendicular to the rotation axis direction (B, F) of the rotation shaft 51.

In the present embodiment, at least the movable side of the swing member 80 is formed of a sheet-like elastic member.

With this configuration, the movable side of the swing member 80 can swing about the fixed portion 811 in such a manner as to be elastically deformed to be bent upward with respect to the fixed portion 811 when the leading end portion is pressed by the stirring member 53, and elastically restored to its original shape by elastic recovery when the stirring member 53 is separated from the leading end portion.

In the present embodiment, the stirring member 53 is a stirring blade. The stirring blade is formed of a sheet-like elastic member having hardness higher than that of the elastic member at the movable side of the swing member 80.

With this configuration, the stirring member 53 as the stirring blade can rotate while being in contact with the inner wall (44, 45) and the bottom portion 41 by elastic deformation in a lower space of the holder 40, and therefore the stirring member 53 can scrape out and stir the powder adhering to the lower region of the inner wall (44, 45) and to the surface of the bottom portion 41. At the same time, since the hardness of the stirring member 53 is higher than that of the elastic member at the movable side of the swing member 80, the stirring member 53 can easily push upward the movable side of the swing member 80.

Figure 6:
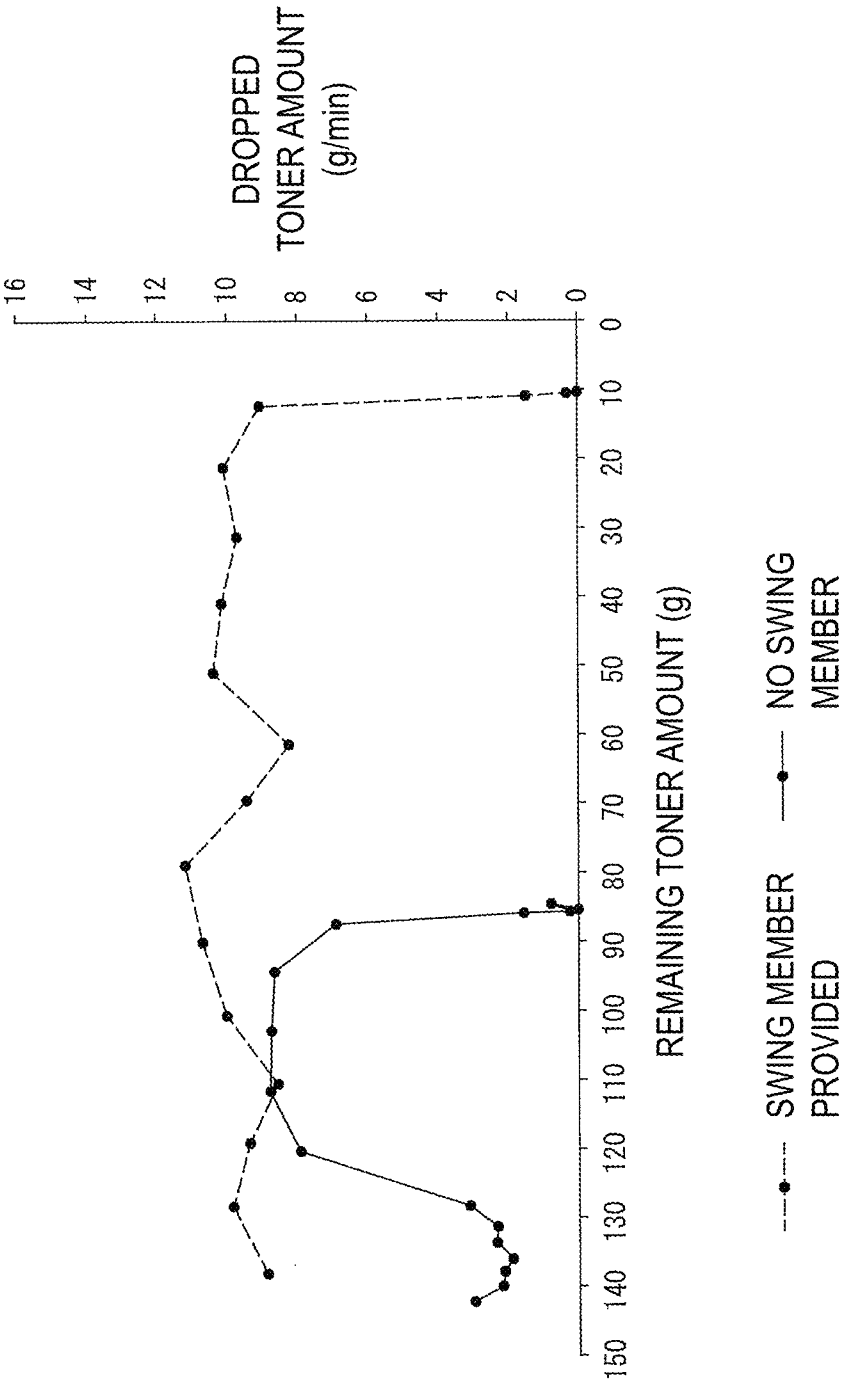
FIG. 6 is a graph depicting an experimental result regarding a remaining toner amount in the powder container in the first embodiment.

FIG. 6 is a graph depicting a result of an experiment conducted to verify the effect of the toner cartridge 10 of the present embodiment. In the graph depicted in FIG. 6, sampling data (black dots) obtained by measuring the amount of remaining toner (g) in the holder 40 (horizontal axis) with respect to the amount of dropped toner (g/min) from the holder 40 (vertical axis) is depicted. A curved line connecting the dots by a solid line indicates a measurement result when the swing member 80 is not provided, while a curved line connecting the dots by a broken line indicates a measurement result when the swing member 80 is provided. As can be understood from FIG. 6, the provision of the swing member 80 brings a significant reduction in the amount of remaining toner as compared with the case where the swing member 80 is not provided.

Modified Example of First Embodiment

In the present embodiment, in a case where the swing member 80 is not pressed by the stirring member 53, the movable side of the swing member 80 may float from the first wall (in this example, the rear wall 43) of the holder 40. In this case, since the stirring member 53 easily gets under the swing member 80, the swing member 80 can be easily pushed upward.

Figure 7:
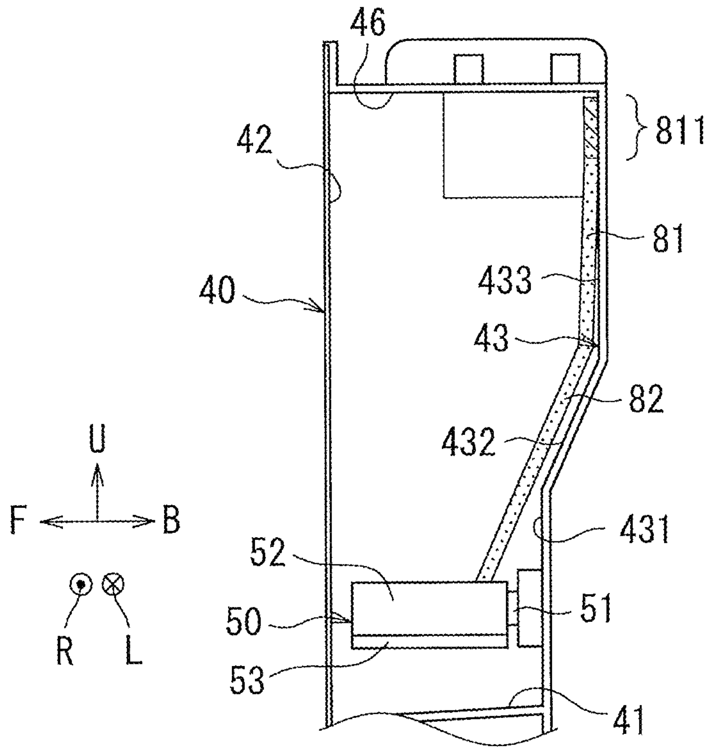
FIG. 7 is a cross-sectional view illustrating a modified example of the swing member in the first embodiment.

For example, in a modified example illustrated in FIG. 7, the swing member 80 is configured to extend to a position where the leading end of the lower swing portion 82 comes into contact with the rotation shaft 51 when the swing member 80 is not pressed by the stirring member 53.

In the present embodiment, the powder container is the toner cartridge 10, but the powder container may be a toner supply device that temporarily stores the toner supplied from the toner cartridge. This also applies to a second embodiment and a third embodiment described below.

Second Embodiment

Since the second embodiment of the present disclosure is different from the above-described first embodiment only in the structure of a swing member 80, the swing member 80 will be mainly described below, and the same components will be denoted by the same reference signs and description thereof will be omitted.

Figure 8:
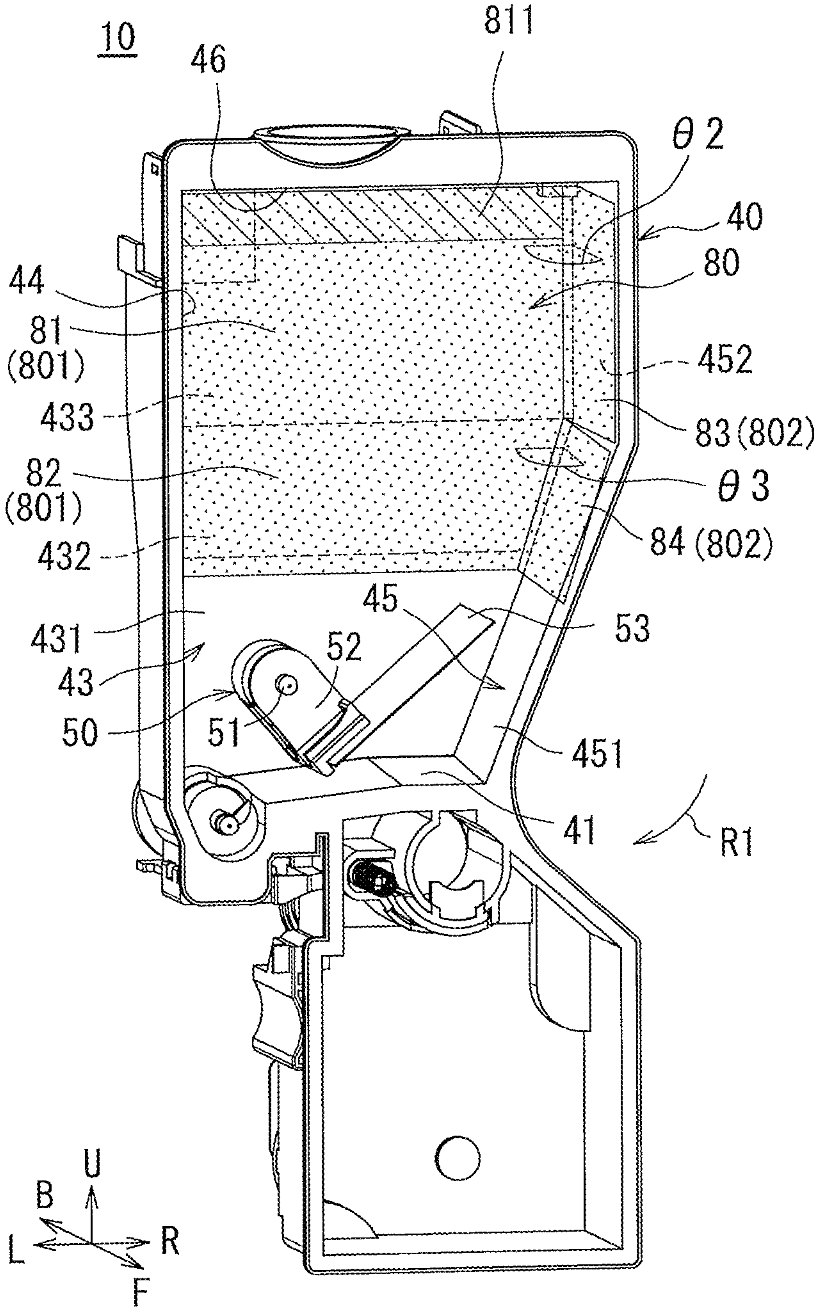
FIG. 8 is a perspective view illustrating a powder container provided with a swing member in a second embodiment.
Figure 9:
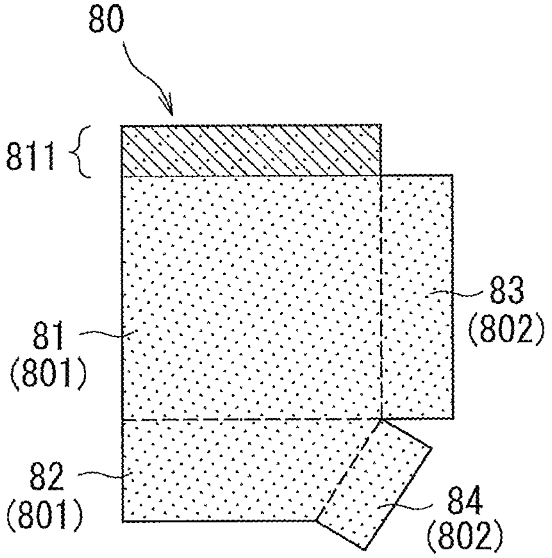
FIG. 9 is an expanded diagram illustrating the swing member in the second embodiment.

FIG. 8 is a perspective view of a toner cartridge 10 provided with the swing member 80 in the present embodiment. In the first embodiment described above, the swing member 80 is installed to be in contact with only the rear wall 43 when the swing member 80 is not pressed by the stirring member 53. However, in the present embodiment, as depicted in FIG. 8, the swing member 80 is configured to be in contact with not only a rear wall 43 but also a right wall 45 adjacent to the rear wall 43 (for example, a region near a rear end portion of the right wall 45). FIG. 9 is an expanded diagram illustrating the swing member 80 in the present embodiment.

As illustrated in FIGS. 8 and 9, the swing member 80 is formed of a sheet-like elastic member, and includes an upper swing portion 81 having a rectangular shape, a lower swing portion 82 having a trapezoidal shape, an upper right swing portion 83 having a belt shape, and a lower right swing portion 84 having a belt shape. When the swing member 80 is not pressed by a stirring member 53, the upper swing portion 81 is in contact with the entire area of a third rear wall 433, and the lower swing portion 82 is in contact with the entire area of a second rear wall 432 and extends toward a rotation shaft 51 beyond the lower end of the second rear wall 432. When the swing member 80 is not pressed by the stirring member 53, the upper right swing portion 83 is in contact with a region of a second right wall 452, and the lower right swing portion 84 is in contact with a region of a first right wall 451. In this case, the upper swing portion 81 and the lower swing portion 82 constitute a first swing portion 801, and the upper right swing portion 83 and the lower right swing portion 84 constitute a second swing portion 802. A fixed portion 811, the upper swing portion 81, the lower swing portion 82, the upper right swing portion 83, and the lower right swing portion 84 are integrally formed. The upper swing portion 81 is connected to the fixed portion 811, which fixes the swing member 80 to the rear wall 43.

The lower swing portion 82 is bent forward at a predetermined angle θ1 (see FIG. 5A) with respect to the upper swing portion 81 in accordance with the inclined angle of the second rear wall 432 with respect to the third rear wall 433. The upper right swing portion 83 is separated from the lower right swing portion 84 and is bent at a predetermined angle θ2 (in this example, an angle of about 90 degrees formed between the third rear wall 433 and the second right wall 452) with respect to the upper swing portion 81 in such a manner as to be in contact with the second right wall 452 intersecting the third rear wall 433 when the swing member 80 is not pressed by the stirring member 53. The lower right swing portion 84 is bent at a predetermined angle θ3 (in this example, an angle of about 90 degrees formed between the second rear wall 432 and the first right wall 451) with respect to the lower swing portion 82 in such a manner as to be in contact with the first right wall 451 intersecting the second rear wall 432 when the swing member 80 is not pressed by the stirring member 53. That is, the swing member 80 is bent at a corner between the third rear wall 433 and the second rear wall 432, a corner between the third rear wall 433 and the second right wall 452, and a corner between the second rear wall 432 and the first right wall 451.

The base side of the swing member 80 is fixed (for example, bonded) to the upper end portion of the third rear wall 433 with the fixed portion 811 connected to the upper end portion of the upper swing portion 81. When the swing member 80 is not pressed by the stirring member 53, the upper swing portion 81 is brought into contact with the entire area of the third rear wall 433. When the swing member 80 is not pressed by the stirring member 53, the lower swing portion 82 is in contact with the entire area of the second rear wall 432, and the leading end portion of the swing member 80 extends toward the rotation shaft 51 to be closer to the rotation shaft 51 than the second rear wall 432. When the swing member 80 is not pressed by the stirring member 53, the upper right swing portion 83 faces along the second right wall 452, and the lower right swing portion 84 faces along the first right wall 451.

When the leading end portion of the lower swing portion 82 of the swing member 80 is pressed by the stirring member 53 due to the rotation of the rotation shaft 51, the swing member 80 swings about the fixed portion 811. Next, the operations thereof will be described in detail.

Here, the stirring member 53 is formed of a sheet-like elastic member having hardness higher than that of the elastic member of the swing member 80. When the stirring member 53 rotates in a first rotation direction R1 together with the rotation shaft 51, the stirring member 53 presses (pushes upward) the lower swing portion 82 of the swing member 80 and moves it in a direction away from the second rear wall 432. As a result, the upper swing portion 81 fixed with the fixed portion 811 moves in a direction away from the third rear wall 433 caused by the movement of the lower swing portion 82, the upper right swing portion 83 moves upward interlocking with the movement of the upper swing portion 81, and the lower right swing portion 84 moves upward interlocking with the movement of the lower swing portion 82. Thereafter, when the leading end portion of the stirring member 53 further moves toward the downstream side in the first rotation direction R1 and separates from the leading end portion of the lower swing portion 82, the swing member 80 swings in a direction approaching the second rear wall 432 and the third rear wall 433 due to the elastic recovery force and its own weight and returns to the original state.

That is, as the stirring member 53 rotates on a plane perpendicular to the rotation axis direction (B, F) of the rotation shaft 51, the swing member 80 swings about the fixed portion 811 along the intersecting direction (L, R) with respect to the rotation axis direction (B, F) of the rotation shaft 51, thereby repeating operations of separating from the rear wall 43 or coming into contact with the rear wall 43 and scraping at least part of the right wall 45. With this, the toner in the vicinity of the second rear wall 432 and the third rear wall 433 can be reliably dropped, and the toner in the vicinity of the first right wall 451 and the second right wall 452 can also be reliably dropped. Therefore, it is possible to more effectively prevent the toner from remaining on the inner wall (42 to 45), particularly on the first inclined surface 432*a* and the second inclined surface 451*a*.

Compared with the above-described first embodiment, the upper right swing portion 83 and the lower right swing portion 84 can scrape a wide range of the right wall 45, whereby the effect of preventing the toner from remaining may be further improved.

In the present embodiment, the inner wall (42 to 45) includes a second wall (in this example, the right wall 45) adjacent to a first wall (in this example, the rear wall 43) and perpendicular to the first wall (43). The swing member 80 is in contact with both the first wall (43) and the second wall (45).

In this configuration, the swing member 80 can drop the toner for both the first wall (43) and the second wall (45) adjacent to each other and perpendicular to each other.

In the present embodiment, the swing member 80 includes the first swing portion 801 (in this example, the upper swing portion 81 and the lower swing portion 82) in contact with the first wall (43), and the second swing portion 802 (in this example, the upper right swing portion 83 and the lower right swing portion 84) connected from the first swing portion 801 (81, 82) to the second wall (45) side and brought into contact with the second wall (45).

In this configuration, when the first swing portion 801 in contact with the first wall (43) swings, the second swing portion 802 in contact with the second wall (45) can also swing the first swing portion 801 together with the second swing portion 802 in a predetermined swing direction (in the up-down direction in this example) along the second wall (45) while interlocking with the first swing portion 801.

Further, in the present embodiment, the swing member 80 is bent at a corner between the first wall (43) and the second wall (45), and the bent portions at the second wall (45) side (in this example, the upper right swing portion 83 and the lower right swing portion 84) come into contact with the second wall (45).

With this configuration, a single swing member 80 can be brought into contact with both the first wall (43) and the second wall (45). In addition, when the swing member 80 is not pressed by the stirring member 53, the swing member 80 can be set along each of the first wall (43) and the second wall (45) so as not to be separated from the first wall (43) and the second wall (45) at the corner mentioned above.

Modified Example of Second Embodiment

Figure 10:
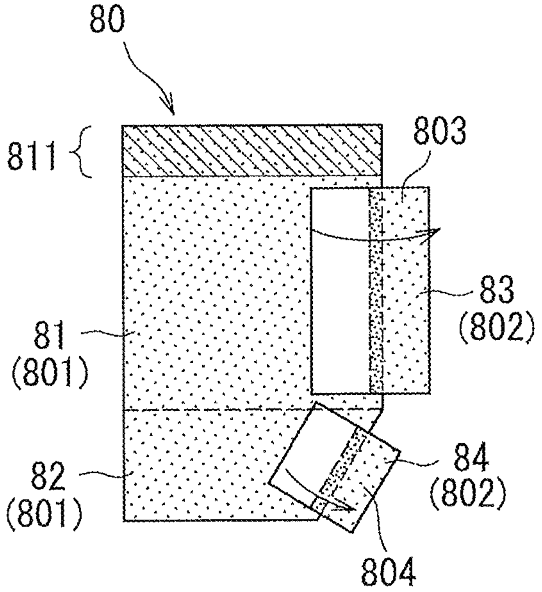
FIG. 10 is an expanded diagram illustrating a modified example of the swing member in the second embodiment.

FIG. 10 is an expanded diagram illustrating a modified example of the swing member 80 in the second embodiment.

As illustrated in FIG. 10, the swing member 80 includes folded portions 803 and 804 (in this example, the upper right swing portion 83 and the lower right swing portion 84) each obtained by cutting out part of the swing member 80 on the second wall (45) side and folding back the swing member 80 on the second wall (45) side. The folded portions 803 and 804 (83, 84) are in contact with the second wall (45).

With this configuration, the swing member 80 can be easily manufactured.

For example, in the modified example illustrated in FIG. 10, the upper right swing portion 83 of the swing member 80 is formed by cutting out part of the upper swing portion 81 (part thereof on the right side) and folding back the upper swing portion 81 on the right side to the right side at about 90 degrees. The lower right swing portion 84 is formed by cutting out part of the lower swing portion 82 (part thereof on the right side) and folding back the lower swing portion 82 on the right side to the front side. When the swing member 80 is not pressed by the stirring member 53, the upper right swing portion 83 and lower right swing portion 84 are folded back with respect to the upper swing portion 81 and lower swing portion 82 at a predetermined angle (e.g., 90 degrees or more) at which the upper right swing portion 83 and lower right swing portion 84 can be respectively in contact with the second right wall 452 and first right wall 451 orthogonal to the third rear wall 433 and second rear wall 432.

Third Embodiment

Since the third embodiment of the present disclosure is different from the above-described second embodiment only in the shape of a swing member 80, the swing member 80 will be mainly described below, and the same components will be denoted by the same reference signs and description thereof will be omitted.

In the second embodiment described above, when the swing member 80 is pushed upward by the stirring member 53, the upper right swing portion 83 is likely to interfere with the ceiling portion 46, and the lower right swing portion 84 is likely to interfere with the upper right swing portion 83. As a result, the swing regions of the upper right swing portion 83 and the lower right swing portion 84 may be restricted. In this case, for example, the upper right swing portion 83 and the lower right swing portion 84 can scrape only partial regions of the second right wall 452 and the first right wall 451.

In this regard, in the present embodiment, an upper right swing portion 83 and a lower right swing portion 84 are formed in shapes able to prevent interference with a ceiling portion 46 and the upper right swing portion 83, respectively, when the swing member 80 is pushed upward by a stirring member 53. This configuration makes it possible to increase a region in which the upper right swing portion 83 and the lower right swing portion 84 scrape a second right wall 452 and a first right wall 451 when the swing member 80 is pushed upward by the stirring member 53.

Figure 11:
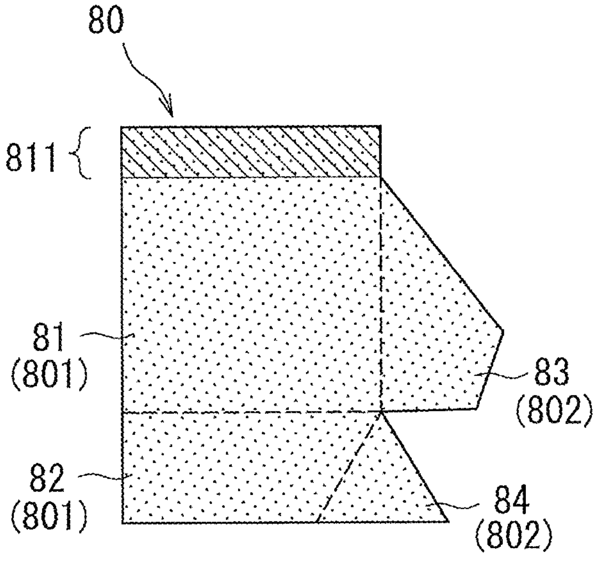
FIG. 11 is an expanded diagram illustrating a swing member in a third embodiment.
Figure 12A:
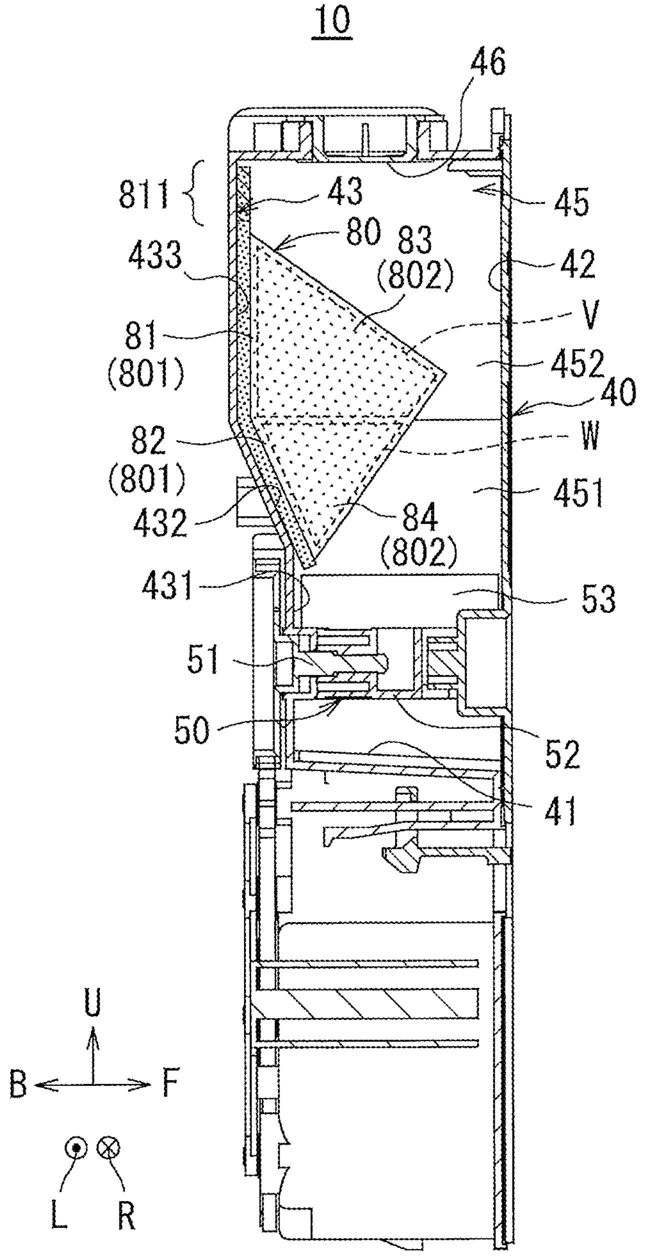
FIG. 12A is a cross-sectional view illustrating a state of the swing member in the third embodiment.
Figure 12B:
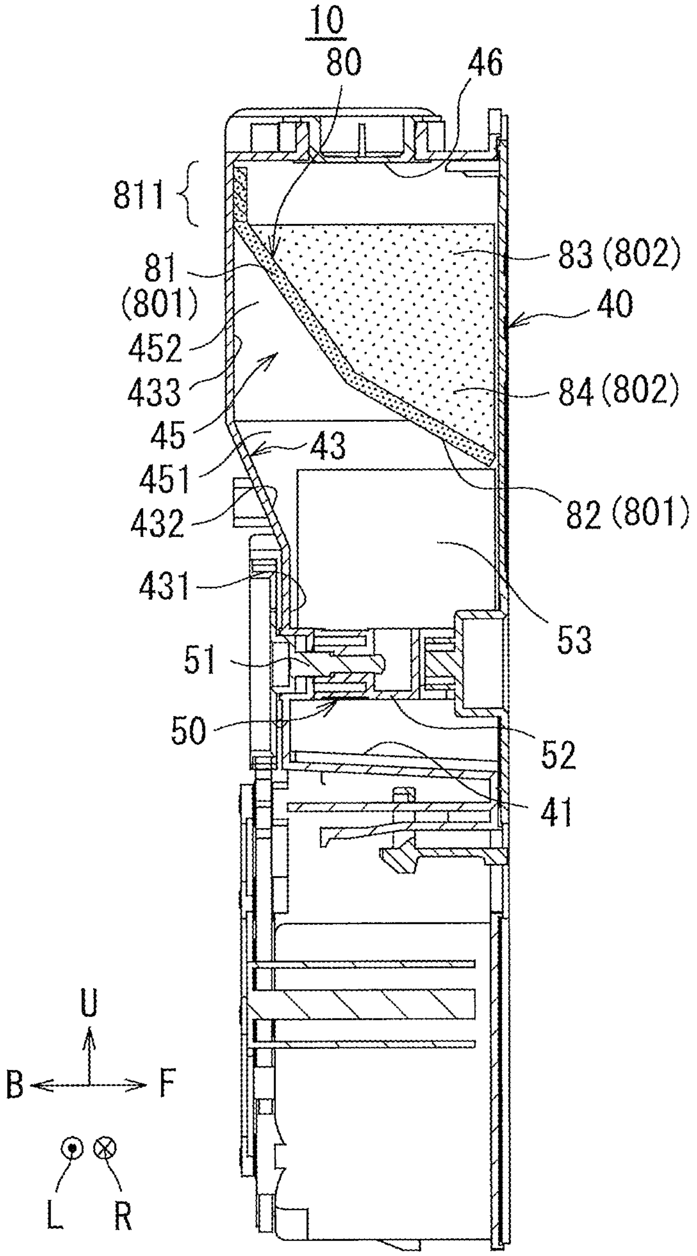
FIG. 12B is a cross-sectional view illustrating a state of the swing member in the third embodiment.

FIG. 11 is an expanded diagram of the swing member 80 in the present embodiment. FIGS. 12A and 12B are each a cross-sectional view (cross-sectional view in the arrow direction along the line A1-A1 in FIG. 2A) of a toner cartridge 10 attached with the swing member 80 in the present embodiment.

As illustrated in FIGS. 11 to 12B, the swing member 80 is formed of a sheet-like elastic member, and there are included an upper swing portion 81 having a rectangular shape, a lower swing portion 82 having a trapezoidal shape, the upper right swing portion 83 having a quadrilateral shape (same shape as a region V), and the lower right swing portion 84 having a triangular shape (same shape as a region W) in a holder 40. When the swing member 80 is not pressed (not pushed upward) by the stirring member 53, the upper swing portion 81 is in contact with the entire area of a third rear wall 433, and the lower swing portion 82 is in contact with the entire area of a second rear wall 432 and extends toward a rotation shaft 51 beyond the lower end of the second rear wall 432. An upper portion of the upper right swing portion 83 is cut out so that the upper right swing portion 83 does not interfere (come into contact) with the ceiling portion 46 when the swing member 80 is pushed upward by the stirring member 53, and the upper right swing portion 83 is brought into contact with the region V (a region surrounded by a dotted line in FIG. 12A) of the second right wall 452. Further, an upper portion of the lower right swing portion 84 is cut out so that the lower right swing portion 84 does not interfere (come into contact) with the upper right swing portion 83 when the swing member 80 is pushed upward by the stirring member 53, and the lower right swing portion 84 is brought into contact with the region W (a region surrounded by a broken line in FIG. 12A) of the first right wall 451.

A fixed portion 811, the upper swing portion 81, the lower swing portion 82, the upper right swing portion 83, and the lower right swing portion 84 are integrally formed. The upper swing portion 81 is connected with the fixed portion 811, which fixes the swing member 80 to the rear wall 43.

The swing member 80 is disposed such that, when it is not pushed upward by the stirring member 53, the upper right swing portion 83 is in contact with the region V of the second right wall 452 and the lower right swing portion 84 is in contact with the region W of the first right wall 451. When a movable side of the lower swing portion 82 is pressed by the stirring member 53 due to the rotation of the rotation shaft 51, the swing member 80 swings about the fixed portion 811 so as to separate from the rear wall 43 or come into contact with the rear wall 43, and to repeat the operations of scraping the entire area of the upper half portion of the first right wall 451 and substantially the entire area of the second right wall 452, for example.

With this, the toner in the vicinity of the second rear wall 432 and the third rear wall 433 can be reliably dropped, and the toner in the vicinity of the first right wall 451 and the second right wall 452 can also be more reliably dropped. Therefore, it is possible to stably and reliably prevent the toner from remaining on the inner wall (42 to 45), particularly on the first inclined surface 432*a* and the second inclined surface 451*a*.

In the present embodiment, the swing member 80 is preferably configured to have such a shape that the upper right swing portion 83 and the lower right swing portion 84 contact (cover) substantially the entire area of the second right wall 452 and part of the first right wall 451 (a corner between the front end and the upper end) when the leading end portion of the stirring member 53 reaches the uppermost position. This configuration makes it possible to widen the range in which the upper right swing portion 83 and the lower right swing portion 84 scrape the right wall 45 as compared with the second embodiment described above. Therefore, it is possible to more effectively drop the toner on the inner wall (42 to 45). As a result, the effect of preventing the toner from remaining may be further improved.

The embodiments described above are illustrative in all respects and are not the basis for a limited interpretation. Accordingly, the technical scope of the present disclosure is not intended to be construed only by the foregoing embodiments, and is defined based on the description of the claims. In addition, meanings equivalent to the claims and all modifications made within the scope thereof are included in the technical scope of the present disclosure.

INDUSTRIAL APPLICABILITY

The present disclosure can effectively reduce the amount of toner remaining in the powder container, and therefore the present disclosure can be applied to a powder container and an image forming device including the powder container, such as a copy machine, a multifunctional device, a printer, or a facsimile device.

The invention claimed is:

1. A powder container comprising:

a holder that stores powder and includes a discharge port through which the powder is discharged;

a stirring unit that stirs the powder; and a swing member to drop the powder remaining on an inner wall of the holder, wherein the stirring unit includes a rotation shaft rotatably supported in the holder, and a stirring member provided to the rotation shaft in such a manner as to protrude outward in a radial direction, the inner wall includes a first wall along an intersecting direction intersecting with a rotation axis direction of the rotation shaft, and a base side of the swing member includes a fixed portion that is fixed to the first wall along the intersecting direction of the holder, and a movable side of the swing member swings about the fixed portion by being pressed by the stirring member due to the rotation of the rotation shaft of the stirring unit.

2. The powder container according to claim 1, wherein the inner wall of the holder includes an inclined surface that is inclined to extend outward as being separated upward from a predetermined position above the discharge port, and the swing member comes into contact with the inclined surface.

3. The powder container according to claim 1, wherein the first wall is perpendicular to the rotation axis direction, and the fixed portion of the swing member is fixed to an upper side of the first wall of the holder.

4. The powder container according to claim 3, wherein the inner wall includes a second wall that is adjacent to and perpendicular to the first wall, and the swing member comes into contact with both the first wall and the second wall.

5. The powder container according to claim 4, wherein the swing member includes a first swing portion that comes into contact with the first wall, and a second swing portion that is connected from the first swing portion to the second wall side and comes into contact with the second wall.

6. The powder container according to claim 4, wherein the swing member is folded at a corner between the first wall and the second wall, and a folded portion on the second wall side comes into contact with the second wall.

7. The powder container according to claim 4, wherein the swing member includes a folded portion obtained by cutting out part of the swing member on the second wall side and folding back the swing member on the second wall side, and the folded portion comes into contact with the second wall.

8. The powder container according to claim 1, wherein the movable side of the swing member floats from the first wall of the holder at a time of the swing member being not pressed by the stirring member.

9. The powder container according to claim 1, wherein at least the movable side of the swing member is formed of a sheet-like elastic member, the stirring member is a stirring blade, and the stirring blade is formed of a sheet-like elastic member having hardness higher than hardness of the elastic member of the swing member.

10. An image forming device, comprising:

the powder container according to claim 1.

* * * * *